(12) United States Patent
Lee

(10) Patent No.: US 7,784,493 B2
(45) Date of Patent: Aug. 31, 2010

(54) MANUAL VALVE OF A HYDRAULIC PRESSURE CONTROL SYSTEM FOR AN AUTOMATIC TRANSMISSION

(75) Inventor: Jin Hee Lee, Seongnam (KR)

(73) Assignee: Hyundai Motor Company, Seoul (KR)

( * ) Notice: Subject to any disclaimer, the term of this patent is extended or adjusted under 35 U.S.C. 154(b) by 883 days.

(21) Appl. No.: 11/580,002

(22) Filed: Oct. 12, 2006

(65) Prior Publication Data

US 2007/0125433 A1    Jun. 7, 2007

(30) Foreign Application Priority Data

Dec. 6, 2005  (KR) .................. 10-2005-0118360

(51) Int. Cl.
*F15B 13/04* (2006.01)
(52) U.S. Cl. .......... 137/625.69; 91/446; 475/131
(58) Field of Classification Search .......... 137/625.69, 137/625.35, 625.68, 625.2; 477/121, 127; 91/446, 448; 475/131
See application file for complete search history.

(56) References Cited

U.S. PATENT DOCUMENTS 3,949,847 A * 4/1976 Hoehn .................. 192/3.3
4,434,708 A * 3/1984 Bowden .................. 91/436
6,192,928 B1 * 2/2001 Knoell et al. .................. 91/446
6,327,959 B1 * 12/2001 Takahashi et al. .............. 91/436
6,440,028 B2 * 8/2002 Kim et al. .................... 475/131
6,689,007 B2 * 2/2004 Warnke ...................... 475/131

FOREIGN PATENT DOCUMENTS

| JP | 05-248534 | 9/1993 |
| JP | 09-269065 | 10/1997 |
| JP | 11-094060 | 4/1999 |
| JP | 2002-323122 | 11/2002 |

* cited by examiner

*Primary Examiner*—John Rivell
(74) *Attorney, Agent, or Firm*—Morgan, Lewis & Bockius LLP

(57) ABSTRACT

A manual valve of a hydraulic pressure control system for an automatic transmission includes: a valve body including a first exhaust passage that includes an exhausting hole and an intake hole that are communicated with a drive range port in a neutral range, such that a transmission fluid, which is supplied from the drive range port when the vehicle is shifted from drive to neutral, is exhausted; and a hydraulic pressure exhaust control unit that is disposed in the exhaust hole so as to control an exhaust amount according to an exhaust pressure.

4 Claims, 4 Drawing Sheets

MANUAL VALVE OF A HYDRAULIC PRESSURE CONTROL SYSTEM FOR AN AUTOMATIC TRANSMISSION

CROSS-REFERENCE TO RELATED APPLICATION

This application claims priority to and the benefit of Korean Patent Application No. 10-2005-0118360 filed in the Korean Intellectual Property Office on Dec. 6, 2005, the entire contents of which are incorporated herein by reference.

BACKGROUND OF THE INVENTION (a) Field of the Invention

The present invention relates to a manual valve of a hydraulic pressure control system of an automatic transmission of a vehicle. More particularly, the present invention relates to a manual valve that mechanically controls an exhaust amount based on viscosity and temperature of transmission fluid when the vehicle is shifted from drive to neutral.

(b) Description of the Related Art

In general, automatic transmissions control a plurality of solenoid valves based on speed of the vehicle and throttle valve opening, etc., so as to control a hydraulic pressure. Accordingly, since a shift gear of a target shift range is moved by the hydraulic pressure, shifting occurs automatically.

If a driver moves a lever into a desired shift range, ports of the manual valve of the hydraulic pressure control system are changed such that the hydraulic pressure is supplied from a hydraulic pump to a plurality of operational elements, which are operated by the hydraulic pressure. Such operational elements are selectively operated according to duty cycles of the solenoid valves.

At very low temperatures, since the pressure control valve is controlled by a pressure control solenoid valve so as to control a release pressure, complex control logic is required.

In addition, if the pressure control solenoid valve of the pressure control valve is out of order at very low temperatures, the release pressure may not be controlled. Accordingly, if exhaust time of the transmission fluid is extended, that is, if release of a friction element is insufficient when the vehicle is in neutral, the vehicle may unintentionally move forward.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a manual valve of a hydraulic pressure control system for an automatic transmission that optimally responds in various circumstances, such as at very low temperatures and at room temperature, by mechanically controlling an exhaust amount based on viscosity and temperature of automatic transmission fluid (ATF) when a vehicle is shifted from drive to neutral.

An exemplary embodiment of the present invention provides a manual valve of a hydraulic pressure control system for an automatic transmission including: a valve body including a first exhaust passage that includes an exhaust hole and an intake hole that are communicated with a drive (D) range port in a neutral (N) range, such that a transmission fluid is exhausted; and a hydraulic pressure exhaust control unit that is disposed in the exhaust hole so as to control an exhaust amount according to exhaust pressure.

The exhaust hole includes a small diameter portion that is positioned to an intake hole side, a large diameter portion that is positioned to an opposite side, and a middle diameter portion between the small and large diameter portions. A drain hole is formed in the large diameter portion. The hydraulic pressure exhaust control unit includes a slider that slides along the middle diameter portion by the exhaust pressure, and the slider includes at least one main hole that communicates with the drain hole according to its amount of movement.

The slider may be cylindrical. A rear surface portion of the slider, facing the intake hole, may be open; and a front surface portion may be closed. The at least one main hole may include an orifice on the front surface portion of the slider, and a penetration hole that is formed on a circumference of the slider and has a larger diameter than that of the orifice.

The hydraulic pressure exhaust control unit may further include: an elastic member including a first end that is disposed on the front surface portion of the slider; a plug that is supported by a second end of the elastic member and that closes the end portion of the exhaust hole; and a fixing pin that fixes the plug to the exhaust hole.

DETAILED DESCRIPTION OF THE PREFERRED EMBODIMENTS

An exemplary embodiment of the present invention will hereinafter be described in detail with reference to the accompanying drawings.

Figure 1:
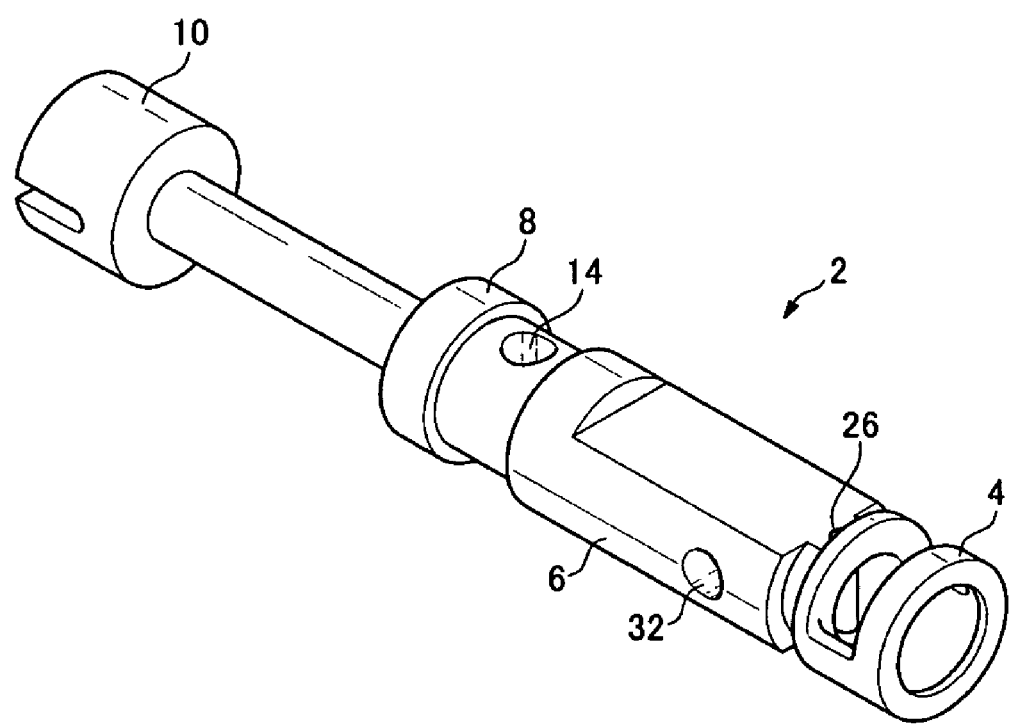
FIG. 1 is a perspective view showing a valve spool of a manual valve according to an exemplary embodiment of the present invention.
Figure 2:
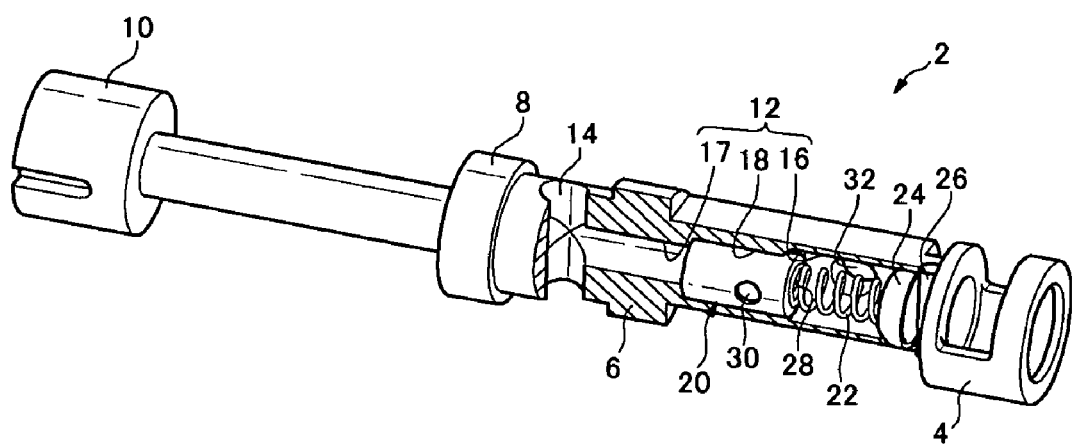
FIG. 2 is a cross-sectional view of a principal part showing operation of the valve spool of FIG. 1 at room temperature.
Figure 3:
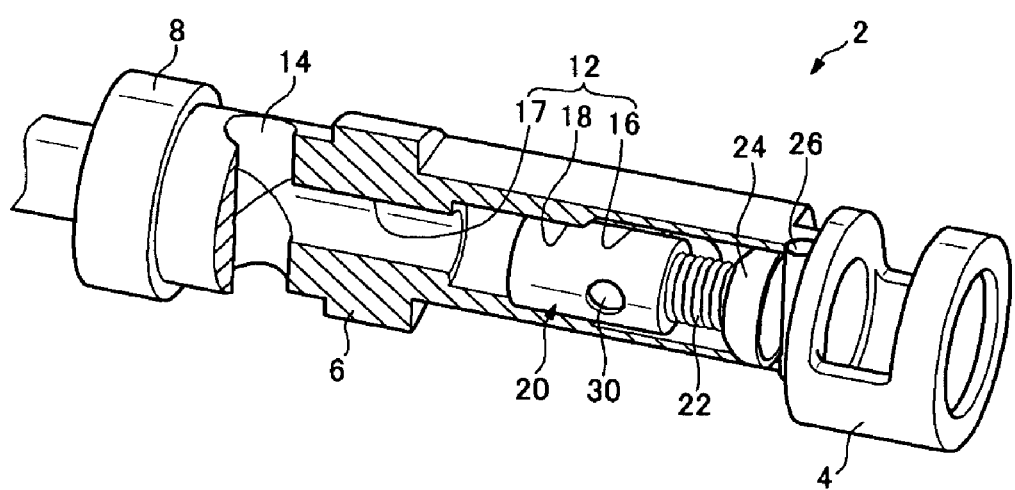
FIG. 3 is a cross-sectional view of a principal part showing operation of the valve spool of FIG. 1 at low temperature.

Referring to FIGS. 1-3, valve spool 2 includes a connecting part 4, which is configured to be connected to the select lever of a driver's seat (not shown), and first, second, and third lands 6, 8, and 10. Lands 6, 8, and 10 are spaced apart from each other by predetermined gaps according to a port design of the valve body.

An exhaust hole 12 is axially formed in the valve spool 2 from an end portion of the connecting part 4 to a portion between the first and second lands 6 and 8, and an end portion of the exhaust hole 12 is radially connected with an intake hole 14 so that hydraulic pressure that flows into the intake hole 14 is exhausted through the exhaust hole 12.

The exhaust hole 12 may have a large diameter portion 16, a small diameter portion 17, and a middle diameter portion 18 disposed between the large diameter portion 16 and the small diameter portion 17. A hydraulic pressure exhaust control unit is inserted into the exhaust hole 12 and includes a slider 20, an elastic member 22, a plug 24, and a fixing pin 26.

The fixing pin 26 is disposed radially at an inner side of the connecting part 4, and the plug 24 is supported by the fixing pin 26 and closes the end portion of the exhaust hole 12.

Elastic member 22 may be a compressed coil spring which is elastically supported between the plug 24 and the slider 20 and pushes the slider 20 toward the intake hole 14.

Figure 4:
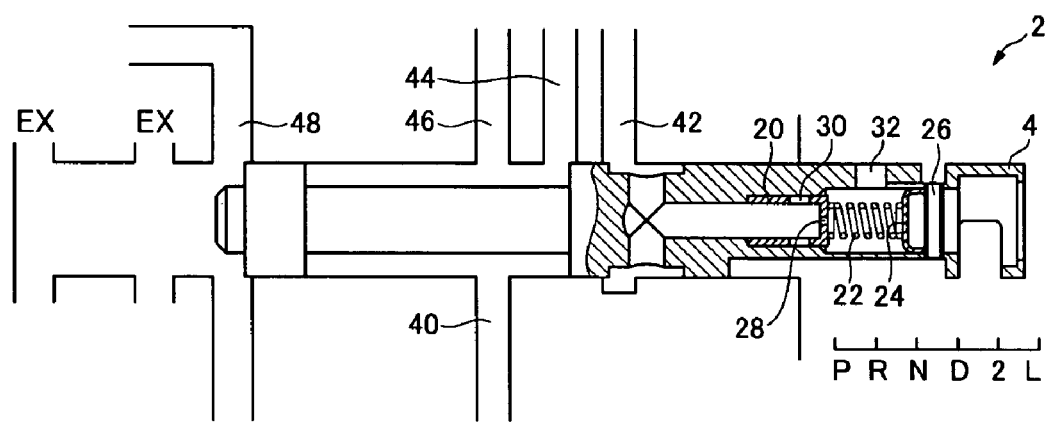
FIG. 4 is a cross-sectional view of a principal part showing the valve spool of FIG. 1 and a valve body.

The slider 20, as shown in FIGS. 2-4, may be a cylinder that is open on the side facing the intake hole 14. An orifice 28 is formed on the surface of slider 20 that faces the plug 24. A penetration hole 30 is formed on a circumference of the slider 20, and has a larger diameter than that of the orifice 28.

In addition, a drain hole 32 is formed on the large diameter portion 16. Drain hole 32 exhausts the transmission fluid that is exhausted through the penetration hole 30 when the penetration hole 30 is positioned in the large diameter portion 16, as seen in FIG. 3, by movement of the slider 20 toward the plug 24 due to exhaust pressure overcoming an elastic force of the elastic member 22.

The drain hole 32 communicates with the orifice 28 when the penetration hole 30 of the slider 20 is positioned to the middle diameter portion of the exhaust hole 12, as seen in FIG. 2, and communicates with both the orifice 28 and the penetration hole 30 if the penetration hole 30 is opened by being positioned in the large diameter portion 16 as seen in FIG. 3.

Referring to FIG. 4, the valve spool 2 is disposed in the valve body, the valve body including an input port 40 that receives the hydraulic pressure supplied from the hydraulic pump and a plurality of ports 42, 44, 46, and 48 that supply the hydraulic pressure from the input port 40 to down stream side lines.

Accordingly, if a driver moves the select lever (not shown) to the neutral N range so as to select neutral or reverse while a vehicle is moving forward, the port 42, which is connected to a drive D range pressure line, is positioned between the first and second lands 6 and 8, so that the hydraulic pressure, which is supplied into the drive D range pressure line, is exhausted.

If viscosity of transmission fluid is low, such as at room temperature, since the exhaust pressure is low, the slider 20 of the manual valve 2 is not pushed. Accordingly, as shown in FIG. 2, the transmission fluid is exhausted through the orifice 28 and the drain hole 32.

If viscosity of the transmission fluid is high such as at very low temperatures, and the transmission fluid is exhausted through only the orifice 28, which has a small diameter, an exhaust resistance thereof is high, and so the slider 20 moves toward the plug 24 by the exhaust pressure that overcomes the elastic force of the elastic member 22.

Accordingly, the penetration hole 30 is opened, and so the transmission fluid is exhausted through both the orifice 28 and the penetration hole 30, and then completely exhausted from the valve spool 2 through the drain hole 32.

Exhausting of the transmission fluid is thus controlled by opening of the penetration hole 30 being varied by the exhaust pressure that varies with viscosity.

As has been explained, according to the present invention, the manual valve can optimally respond in various circumstances, such as at very low temperatures and at room temperature, by mechanically controlling exhaust amount based on viscosity and temperature of automatic transmission fluid (ATF) when a vehicle is shifted from drive to neutral.

In addition, at very low temperatures, the manual valve can prevent the exhaust time of the transmission fluid from being delayed, and consequently, accidents can be prevented. In addition, shift shock is minimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A manual valve of a hydraulic pressure control system for an automatic transmission of a vehicle, comprising:
    a valve body comprising a first exhaust passage that comprises an exhausting hole and an intake hole, wherein the holes communicate with a drive range port when the vehicle is in a neutral range, such that a transmission fluid, supplied from the drive range port when the vehicle is shifted from a drive range to the neutral range, is exhausted; and
    a hydraulic pressure exhaust control unit that is disposed in the exhaust hole and controls an exhaust amount according to an exhaust pressure,
    wherein the exhaust hole comprises a small diameter portion, a middle diameter portion, and a large diameter portion, the small diameter portion being disposed nearest the intake hole and the large diameter portion being disposed farthest from the intake hole while the large diameter portion has a drain hole; and
    wherein the hydraulic pressure exhaust control unit comprises:
    a slider that slides along the middle diameter portion by the exhaust pressure; and
    at least one main hole that communicates with the drain hole according to a position of the slider,
    wherein the slider is substantially cylindrical and comprises an open surface portion at a first end of the slider, which faces the intake hole; and a closed surface portion disposed at a second end of the slider,
    wherein the at least one main hole comprises an orifice disposed on the closed surface portion of the slider, and a penetration hole disposed on a circumference of the slider, and
    wherein a diameter of the penetration hole is larger than a diameter of the orifice, and the intake hole, the penetration hole and the orifice are fluidly connected each other to the drain hole to form a continuous flow passage between the intake hole and the drain hole through the orifice.

2. The manual valve of claim 1, wherein the hydraulic pressure exhaust control unit further comprises:
    an elastic member comprising a first end that is disposed on the closed surface portion of the slider;
    a plug that is supported by a second end of the elastic member and that closes an end portion of the exhaust hole; and
    a fixing pin that fixes the plug to the exhaust hole.

3. A manual valve of a hydraulic pressure control system for an automatic transmission of a vehicle, comprising:
    a valve body comprising a first exhaust passage that comprises an exhaust hole and an intake hole, wherein the holes communicate with a drive range port when the vehicle is in a neutral range, such that a transmission fluid, which is supplied from the drive range port when the vehicle is shifted from a drive range to the neutral range, is exhausted; and
    a slider that slides along the exhaust hole by an exhaust pressure,
    wherein the exhaust hole comprises a small diameter portion, a middle diameter portion, and a large diameter portion, the small diameter portion being disposed nearest the intake hole and the large diameter portion being disposed farthest from the intake hole;
    wherein the slider comprises at least one main hole;

wherein when the slider slides along the exhaust hole, the transmission fluid is exhausted through the at least one main hole and through a drain hole that is disposed on the large diameter portion, wherein the slider comprises a substantially cylindrical shape, of which a rear surface portion, disposed on a first end of the slider facing the intake hole, is open, and a front surface portion, disposed on a second end of the slider, is closed; and wherein the at least one main hole comprises an orifice that is disposed on the front surface portion of the slider, and a penetration hole disposed on a circumference of the slider, a diameter of the penetration hole being larger than a diameter of the orifice, and the intake hole, the penetration hole and the orifice being fluidly connected each other to the drain hole to form a continuous flow passage between the intake hole and the drain hole through the orifice.

4. The manual valve of claim 3, wherein the hydraulic pressure exhaust control unit further comprises:

an elastic member comprising a first end that is disposed on the front surface portion of the slider;

a plug that is supported by a second end of the elastic member and that closes the end portion of the exhaust hole; and a fixing pin that fixes the plug to the exhaust hole.

* * * * *